(12) United States Patent
Popeney et al.

(10) Patent No.: US 11,030,894 B2
(45) Date of Patent: Jun. 8, 2021

(54) SYSTEM AND METHOD FOR TRACKING DIMENSIONAL CHARACTERISTICS OF A DEVICE IN MOTION

(71) Applicant: Variation Reduction Solutions, Inc., Plymouth, MI (US)

(72) Inventors: Michael J. Popeney, Dearborn, MI (US); Michael J. Kleemann, Dearborn, MI (US)

(73) Assignee: Variation Reduction Solutions, Inc., Plymouth, MI (US)

( * ) Notice: Subject to any disclaimer, the term of this patent is extended or adjusted under 35 U.S.C. 154(b) by 78 days.

(21) Appl. No.: 16/450,208

(22) Filed: Jun. 24, 2019

(65) Prior Publication Data

US 2020/0402395 A1    Dec. 24, 2020

(51) Int. Cl.
| | |
|---|---|
| *G08G 1/052* | (2006.01) |
| *G05D 1/00* | (2006.01) |
| *G06K 9/00* | (2006.01) |
| *G06K 9/32* | (2006.01) |
| *G08G 1/017* | (2006.01) |

(52) U.S. Cl.
CPC .......... *G08G 1/052* (2013.01); *G05D 1/0094* (2013.01); *G06K 9/00664* (2013.01); *G06K 9/3233* (2013.01); *G08G 1/0175* (2013.01)

(58) Field of Classification Search
None
See application file for complete search history.

(56) References Cited

U.S. PATENT DOCUMENTS

| | | |
|---|---|---|
| 7,138,780 B2 | 11/2006 | Stahs |
| 7,236,850 B2 | 6/2007 | Kim et al. |
| 8,687,173 B2 | 4/2014 | Rezk et al. |
| 9,333,654 B2 | 5/2016 | Chen et al. |
| 2009/0240372 A1 | 9/2009 | Bordyn et al. |
| 2019/0204072 A1* | 7/2019 | Adams ............... G01B 11/0633 |

* cited by examiner

*Primary Examiner* — Leon Flores
(74) *Attorney, Agent, or Firm* — Quinn IP Law; Nayyer J. Siddiqi

(57) ABSTRACT

System and method for tracking at least one device in real-time. A position encoding unit is configured to detect a position of the device, which is configured to move in a first direction. A stage is configured to selectively move with a forward axis of travel and a reverse axis of travel substantially parallel to the first direction and having a stage speed controllable by a controller. A ranged imaging unit is fixedly mounted to the stage and may selectively scan the device upon command. The controller is configured to obtain a speed of the device. When the device reaches a pre-programmed position, the stage is selectively moved at the stage speed synchronized to the speed of the device to within a predefined match value. The ranged imaging unit is employed to determine dimensional characteristics of the device.

20 Claims, 4 Drawing Sheets

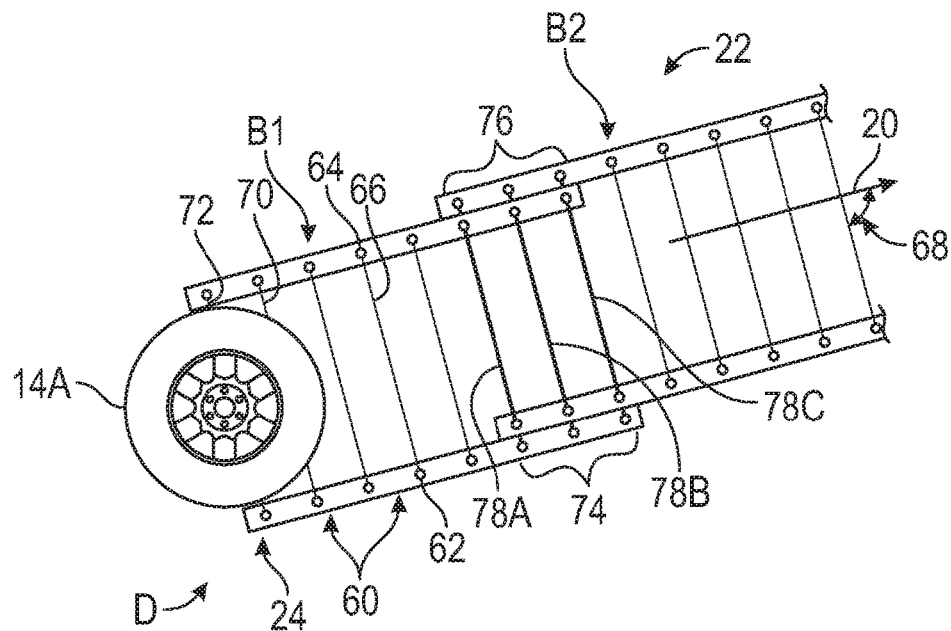
FIG. 2
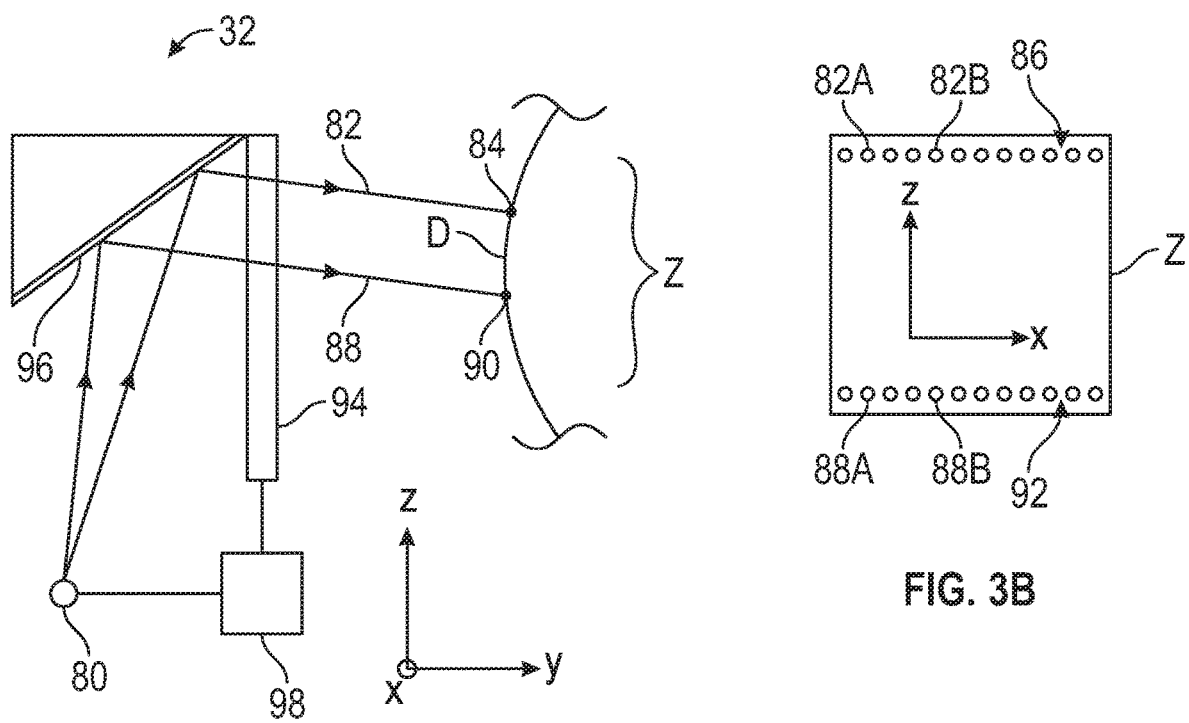
FIG. 3A
FIG. 3B

SYSTEM AND METHOD FOR TRACKING DIMENSIONAL CHARACTERISTICS OF A DEVICE IN MOTION

INTRODUCTION

The present disclosure relates to a system and method for tracking dimensional characteristics of at least one device in motion. Measurement systems generally employ industrial robots with short-range laser triangulation sensors for measuring relative features of vehicles in an assembly line. The robots execute a pre-programmed motion routine, bringing the sensors into close proximity with the moving vehicle and relying on a combination of sensors to provide tracking input to follow the moving vehicle. This architecture has a number of drawbacks. For example, the industrial robots must physically translate and rotate the sensors from point to point, wasting time that could otherwise be used for measurement and limiting the number of points that can be measured per cycle. The limited number of points is often addressed by adding more robots, compounding the time and difficulty of running the system.

Additionally, the robots must reach into the path of the moving vehicle on the conveyor in order to make their close-proximity laser triangulation measurements. If there is a robot fault for any reason, such as for example, joint limit, reach limit, loss of encoder input, the robot stops but the conveyor may not, resulting in an impact that damages the vehicles in addition to elements of the robotic measurement system. The short-range laser triangulation sensors may be poorly suited to measurement of these features, requiring adaptive exposure control to get usable data with varying paint colors. Furthermore, to measure a reasonable number of points, the robots must be programmed close to the extents of their reach and/or joint limits, increasing the fragility of the system to errors caused by variation in vehicle position and cycle start timing.

SUMMARY

Disclosed herein is a system and method for tracking at least one device in real-time. The system includes a position encoding unit configured to obtain position data of the at least one device ("at least one" omitted henceforth). The device is configured to move in a first direction. A controller is in communication with the position encoding unit and has a processor and tangible, non-transitory memory on which instructions are recorded. The system includes a stage configured to selectively move with a forward axis of travel and a reverse axis of travel substantially parallel to the first direction and having a stage speed controllable by the controller. A ranged imaging unit is fixedly mounted to the stage and movable between a predefined start zone and a predefined end zone. The ranged imaging unit is configured to selectively scan the device upon command by the controller.

Execution of the instructions by the processor causes the controller to determine a speed of the device, based in part on the position data from the position encoding unit. When the device reaches a pre-programmed position, the stage is selectively moved at a stage speed synchronized to the speed of the device to within a predefined match value. The ranged imaging unit is employed to determine dimensional characteristics of at least one area of interest on the device.

The system may include a conveyor moving at the speed of the device, with the device being rigidly mounted to the conveyor. The device may be a partially assembled vehicle or a fully assembled vehicle. In one example, the pre-programmed position corresponds to the at least one area of interest on the device crossing the predefined start zone. The controller may be configured to determine if the at least one area of interest has exited the predefined end zone, based in part on the position data. When the at least one area of interest has exited the predefined end zone, the controller may be configured to reverse the stage along the reverse axis of travel to an initial stage position or to a different defined starting position for the next cycle.

The position encoding unit may include an array of photosensor pairs each having a respective emitter and a respective receiver. The respective emitter may be configured to transmit a respective beam directed towards the at least one device at a beam angle relative to the first direction. The respective receiver may be configured to sense a respective beam state of the respective beam and transmit the respective beam state to the controller. The respective receiver may be configured to transmit a location of the respective beam in the array of photosensor pairs that is blocked.

The pre-programmed position may correspond to a respective location of the respective beam of the position encoding unit. The array of photosensor pairs may be configured to have overlapping beams such that at least one pair of the array of photosensor pairs overlaps with another pair of the array of photosensor pairs. The system may include a vision unit having at least one camera and/or at least one laser-based position sensor configured to measure an initial orientation and lateral position of the first device, when the device enters the pre-programmed position. A projection unit may be fixedly mounted to the stage and configured to project data obtained by the ranged imaging unit directly onto the at least one device.

The system may include a stage servo drive in communication with the controller and configured to drive the stage. In one example, the controller is configured to generate a continuous signal encoding the motion of the device, based in part on the position encoding unit, the continuous signal being transmitted as an auxiliary input to the stage servo drive. The stage servo drive is then configured to drive the stage based in part on the auxiliary input. In another example, the controller may be configured to command the stage servo drive to move at a constant value based on the speed of the at least one device when the at least one device reaches a preprogrammed position. Here the controller is configured to monitor the speed of the at least one device and at least one of adjust and abort the stage move command if a difference between the speed of the at least one device and the constant value exceeds a predefined limit.

In another example, the controller may be configured to synchronize an internal scanning motion of the ranged imaging unit with the device based on the position data. In yet another example, the controller may be configured to command the ranged imaging unit to scan the device during a predefined time interval and obtain raw ranged data. The controller may be configured to correct the raw ranged data to match the speed of the device (based in part on the position data from the position encoding unit) during the predefined interval to obtain a modified ranged data. The dimensional characteristics of the area of interest may be obtained based in part on the modified ranged data.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic view of an example position encoding unit that may be employed in the system of FIG. 1;

FIG. 3A is a schematic view of an example ranged imaging unit employed in the system of FIG. 1 and directed at a target zone;

FIG. 3B is a schematic illustration of the target zone of FIG. 3A;

DETAILED DESCRIPTION

Figure 1:
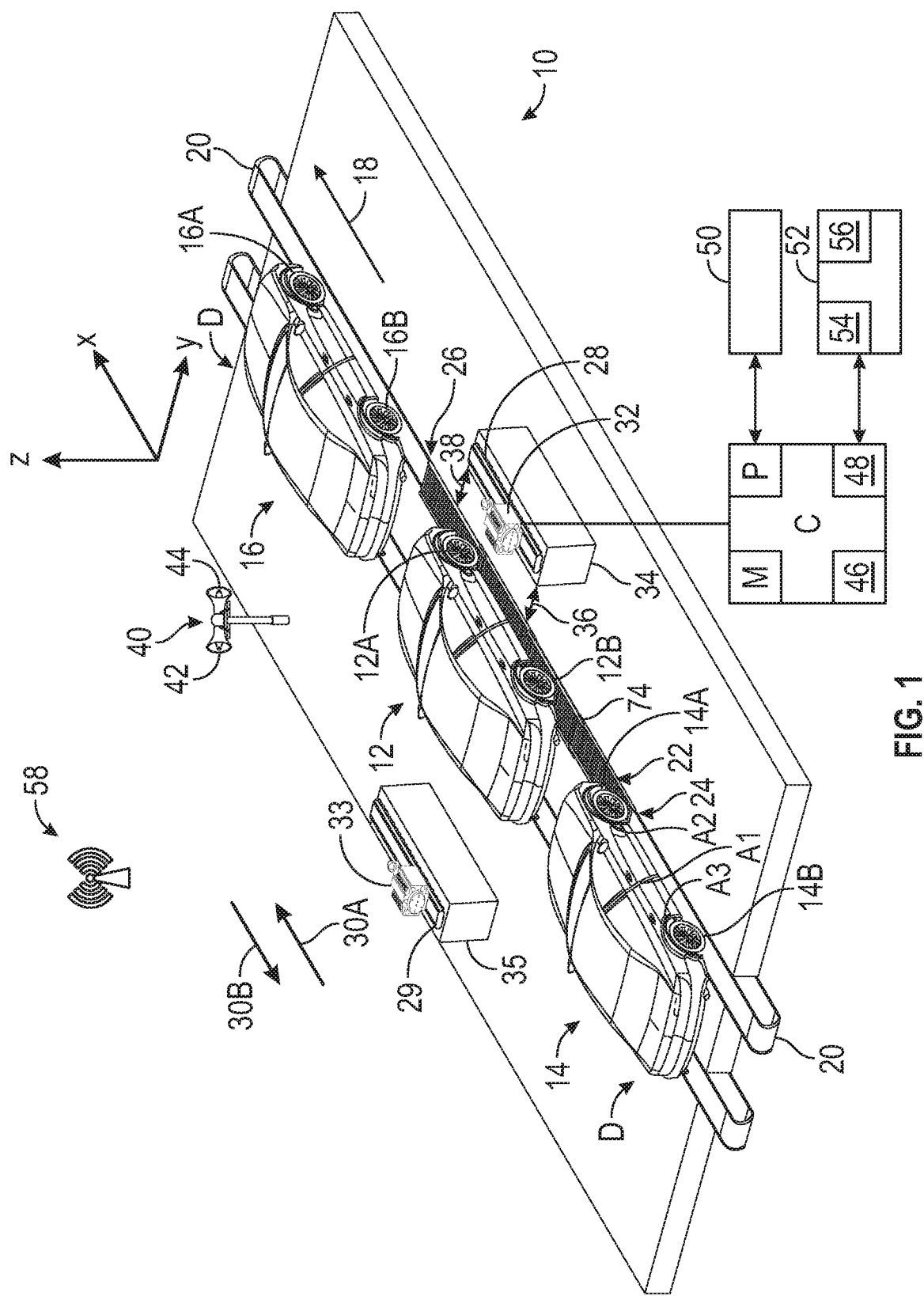
FIG. 1 is a schematic perspective view of a system for tracking at least one device in real-time, the system including a controller and a ranged imaging unit.

Referring to the drawings, wherein like reference numbers refer to like components, FIG. 1 schematically illustrates a system 10 for tracking dimensional characteristics of at least one device D in real-time. The device D may be a mobile platform such as, but not limited to, a passenger car, sport utility car, light truck, heavy duty truck, all-terrain vehicle, minivan, bus, transit vehicle, bicycle, robot, farm implement (e.g. tractor), sports-related equipment (e.g. golf cart), boat, airplane and train. The device D may take many different forms and include multiple and/or alternate components and facilities.

The system 10 is configured to measure dimensional characteristics of the device D as it is moving, for example, measuring local relative features of doors, hatches, intersecting panels and other features in the device D. The measurements may include but are not limited to: length, width, height, step, flush and a gap between a pair of offset surfaces. The system 10 is configured to improve measurement accuracy and speed by employing a measurement modality that does not require mechanical positioning in close proximity to each feature to be measured. Additionally, the system 10 is configured to be insensitive to the paint color of the device D.

Referring to FIG. 1, the at least one device D ("at least one" omitted henceforth) may include a plurality of variably-spaced devices, such as first device 12, second device 14 and a third device 16, each moving in a first direction 18. The device D may be mounted on a conveyor 20 moving in the first direction 18. As shown in FIG. 1, the first device 12 may include respective tires 12A, 12B in contact with the conveyor 20. Similarly, the second device 14 and third device 16 may include respective tires 14A, 14B, 16A, 16B, in contact with the conveyor 20. The conveyor 20 may be continuously moving for various periods at a constant speed, in addition to periods of variable speed, starts and stops. The size and length of the conveyor 20 may be varied based on the application at hand. In one example, the device D is a partially assembled vehicle or a fully assembled vehicle and the conveyor 20 is a large floor-integrated two-track electric chain-drive vehicle conveyor for automotive final assembly.

Referring to FIG. 1, the system 10 includes a position encoding unit 22 extending between a first end 24 and a second end 26. The position encoding unit 22 is configured to track or obtain the position of the device D in real-time, referred to herein as "position data." Referring to FIG. 1, a controller C is in communication with the position encoding unit 22 and includes at least one processor P and at least one memory M (or non-transitory, tangible computer readable storage medium) on which instructions may be recorded for executing various implementations of the system 10. The memory M can store controller-executable instruction sets, and the processor P can execute the controller-executable instruction sets stored in the memory M.

Referring to FIG. 1, the system includes a stage 28, which may be a linear stage, configured to move with a forward axis of travel 30A and a reverse axis of travel 30B substantially parallel with the first direction 18. The stage 28 may be selectively movable upon command by the controller C with a stage speed controllable by the controller C. The stage 28 may be mounted on a base 34.

Referring to FIG. 1, a ranged imaging unit 32 is fixedly mounted to the stage 28 and configured to selectively scan the device D. Referring to FIG. 1, the ranged imaging unit 32 is configured to be movable between a predefined start zone 36 and a predefined end zone 38, defining a range of motion substantially parallel to the first direction 18. Referring to FIG. 1, the ranged imaging unit 32 may be configured to scan a focused laser beam over at least one area of interest, such as a first area of interest A1, a second area of interest A2 and a third area of interest A3, so as to acquire surface profile data point by point. The surface profile data may be employed to verify manufacturing processes or qualify manufactured parts as suitable for a particular application.

Multiple ranged imaging units may be employed. For example, referring to FIG. 1, a second ranged imaging unit 33 may be mounted longitudinally relative on another side of the device D, via a second stage 29 and second base 35. It is to be appreciated that the locations of the position encoding unit 22 and ranged imaging units relative to the device D, such as front, rear or side, may be varied according to the application at hand.

Referring to FIG. 1, the system 10 may include a vision unit 40 having at least camera 42 and/or at least one laser-based position sensor 44 configured to measure an initial orientation of the device D and/or its lateral position (along the Y axis per the XYZ axes shown in FIG. 1). The initial orientation may be defined as the XYZ coordinate of a particular location on the device D, e.g. the center of a front bumper. The vision unit 40 has a fixed location and may be integrated within the system 10 to improve positioning of measurement locations in the presence of lateral and rotational variation of the device D relative to the conveyor 20.

Referring to FIG. 1, the system 10 may include a servo controller 46 and a stage servo drive 48 configured to drive the stage 28, in conjunction with the controller C. An auxiliary position input interface 50 may be in communication with the servo controller 46. The stage servo drive 48 and servo controller 46 may be integral portions of, or separate modules in communication with the controller C. In one example, the system 10 is configured to employ closed-loop feedback control. Here, the controller C (or the servo controller 46) may be configured to generate a continuous signal, e.g. a synthetic encoder signal encoding the position/motion of the device D in digital form, from the position data of the position encoding unit 22. This may be accomplished, for example, by using a high-speed output card (not shown).

The continuous signal may be transmitted as an auxiliary input to the stage servo drive 48 which drives the stage 28 in real-time.

In another example, the system 10 is configured to employ an open-loop constant speed control. Here the controller C (or the servo controller 46) is configured to command the stage servo drive 48 to move at a constant stage speed based on the speed of the device D at a pre-programmed position. The controller C may be configured to monitor the speed of the device D and at least one of adjust and abort the stage move command if a difference between the speed of the device D and the constant stage speed exceeds a predefined limit. For example, if the difference between the speed of the device D and the constant stage speed exceeds 5%, the controller C may be configured to adjust or abort the command to move the stage 28. This mode may be useful when the conveyor 20 has high inertia and is unlikely to undergo significant velocity transients during the nominally constant-velocity motion.

Referring to FIG. 1, the system 10 may include an industrial controller 52 having a first processor 54 programmed to integrate and process the position data and a second processor 56 dedicated to process control. The controller C may be integral with, connected with (e.g. wired) or otherwise in communication with the industrial controller 52, such that it has access to the data in the industrial controller 52. Referring to FIG. 1, the various components of the system 10, including but not limited to the controller C, ranged imaging unit 32 and position encoding unit 22, may be configured to communicate with each other, via a wireless network 58. The circuitry and components of a processor, controller and driver available to those skilled in the art may be employed.

FIG. 2 schematically illustrates an example structure for the position encoding unit 22. It is to be understood that other structures may be employed. Referring to FIG. 2, the position encoding unit 22 may include an array of photo-sensor pairs 60 each having a respective emitter 62 and a respective receiver 64. The respective emitter 62 is configured to transmit a respective beam 66 towards the device D at a beam angle 68 relative to the first direction D. In one embodiment, the beam angle 68 is 90 degrees. The respective receiver 64 may include one or more photocells, such as light-responding silicon chips, that convert incident radiant energy into electrical current, as well as corresponding circuitry.

Referring to FIG. 2, the array of photo-sensor pairs 60 may be arranged such that the respective beams 66 are parallel relative to one another. The array of photo-sensor pairs 60 may be arranged with equal spacing between the respective beams in a longitudinal direction. In one example, the spacing between the respective beams 66 is selected to be between 5 mm and 10 mm. The array of photo-sensor pairs 60 may be arranged longitudinally just above floor level on either side of the device D, on one or both sides of the conveyor 20 such that they provide a continuous coverage of visible light beams. In one example, the respective beams 66 are transverse to the conveyor 20 with tight beam spacing and high-frequency transmission of beam state data. The configuration of the position encoding unit 22 may be varied based on the application at hand.

Referring to FIG. 2, the respective receiver 64 is configured to sense a respective beam state of respective beam 66 and transmit the respective beam state to the controller C. For example, as the respective tire 14A moves past the first end 24 of the position encoding unit 22, a first beam 70 and a second beam 72 are blocked. The respective receiver 64 may be configured to transmit the respective location of the respective beam 66 that is blocked. The array of photo-sensor pairs 60 may be configured to have overlapping beams such that at least one pair of the array of photo-sensor pairs 60 overlaps with another pair of the array of photo-sensor pairs. Referring to FIG. 2, the three emitter-receiver pairs shown in portion 74 and portion 76 overlap to produce overlapping beams 78A, 78B and 78C.

Referring to FIG. 1, the controller C may be configured to determine when the device D reaches a pre-programmed position and trigger an interval. At the interval, the controller C may be configured to determine a speed of the device D based in part on the position data and selectively move the stage 28 at a stage speed synchronized to the speed of the device D to within a predefined match value. The ranged imaging unit 32 is employed to scan at least one area of interest (e.g. first area of interest A1) on the device D. The pre-programmed position may be varied based on the application at hand. For example, the pre-programmed position may be defined by specific beams (e.g. beam B1 and beam B2 in FIG. 2) of the respective beams 66 of the position encoding unit 22. The pre-programmed position may be defined by at least one area of interest on the device D, for example, the first area of interest A1, the second area of interest A2 and the third area of interest A3, shown in FIG. 1.

FIG. 3A schematically illustrates an example structure for the ranged imaging unit 32. It is to be appreciated that other structures may be employed. Referring now to FIG. 3A, the ranged imaging unit 32 may include a source 80 configured to generate, for example, pulsed laser beams or laser dots, directed towards a target zone Z in the device D. The pulsed beam may be reflected, attenuated or scattered at the target zone Z and return to the ranged imaging unit 32, providing range data, which may include surface profile data, a radial distance of the device D, an azimuth angle and an elevation angle.

Referring to FIG. 3A, the source 80 may be configured to generate a first beam 82 directed at a first selected portion 84 of the target zone Z and a second beam 88 directed at a second selected portion 90 of the target zone Z. The target zone Z is schematically shown in FIG. 3B. In the example shown in FIGS. 3A and 3B, the first beam 82 may include a plurality of laser dots, such as dot 82A and dot 82B, defining a first scan line 86. The second beam 88 may include a plurality of laser dots, such as dot 88A and dot 88B, defining a second scan line 92 (see FIG. 3B).

Referring to FIG. 3A, one or more detectors 94 may be configured to receive the respective return signals from the target zone Z. The detectors 94 may be configured to provide an electrical signal based on respective irradiances on their respective active surfaces. Referring to FIG. 3A, the ranged imaging unit 32 may include a beam splitter 96, such as a mirror, for directing the first beam 82 and the second beam 88. The ranged imaging unit 32 may include other components (not shown) available to those skilled in the art, such as for example, a photomultiplier, dispersion devices, apertures, and modulators.

Referring to FIG. 3A, the ranged imaging unit 32 may include an integrated controller 98, in communication with the controller C, for processing the signal received. The integrated controller 98 may be configured to employ the first and second scan lines 86, 92 (see FIG. 3B) to measure a surface profile of the target zone Z based in part on a range data and/or time of flight data for the first and second scan lines 86, 92. The ranged imaging unit 32 may incorporate a LIDAR unit and/or a radar unit. The mechanism of measuring distance may vary based on what is employed in the ranged imaging unit 32. The ranged imaging unit 32 may complete a three-dimensional measurement by using a gimbal (not shown) to direct a laser beam in a direction described by two angles, then measuring the distance to the surface of the target zone Z along the laser beam. The integrated controller 98 may include metrology software available to those skilled in the art to drive the 3D scanning of the ranged imaging unit 32 and collect data, as well as process-specific middleware available to those skilled in the art to facilitate the configuration and operation of the system 10 pertaining to timing and sequencing.

Figure 4:
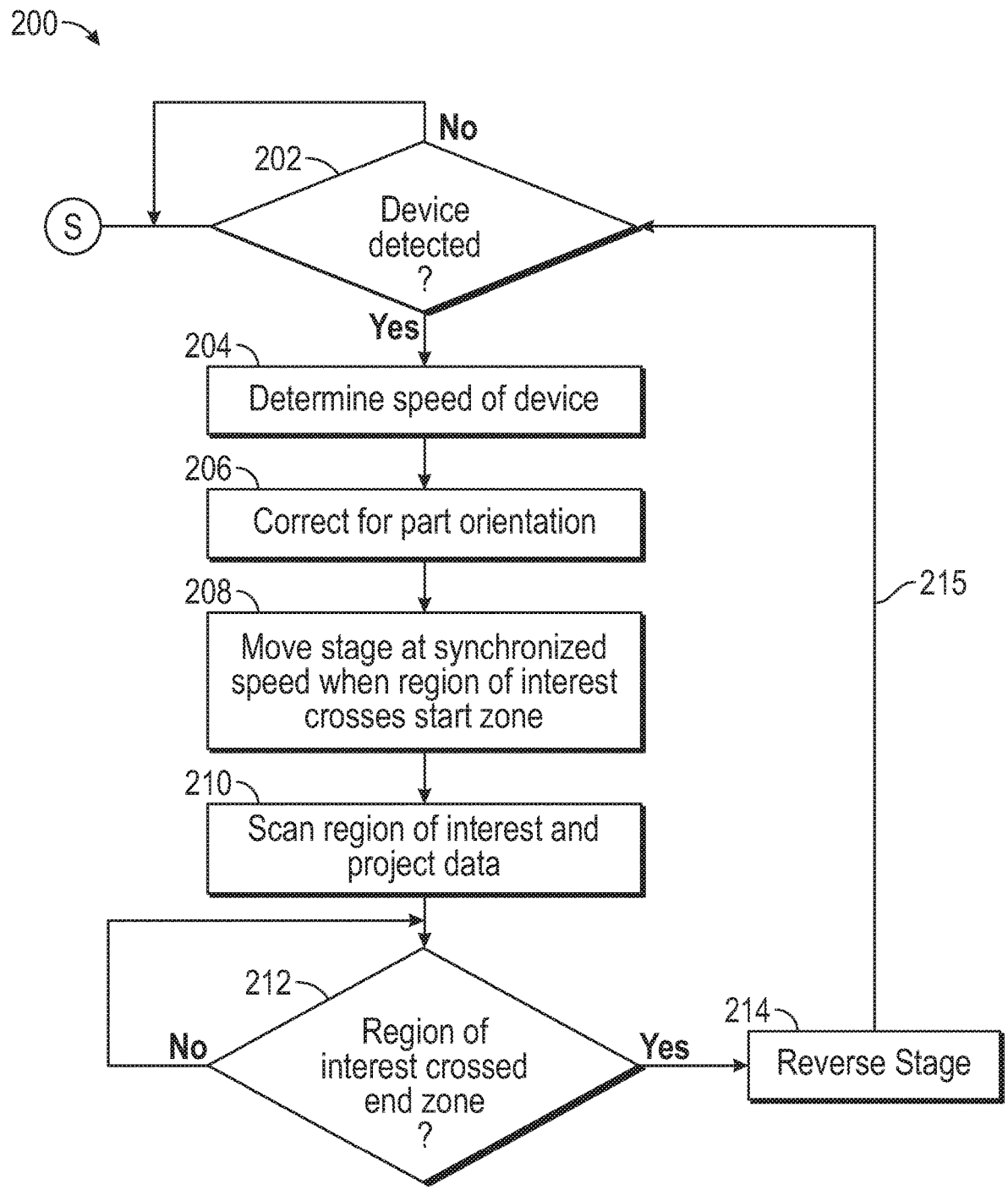
FIG. 4 is a schematic flow diagram for an example method executable by the controller of FIG. 1.

Referring now to FIG. 4, a flowchart of a method 200 stored on and executable by the controller C of FIG. 1 is shown. Method 200 is an example implementation of the system 10 and other implementations may be employed. Method 200 need not be applied in the specific order recited herein. Furthermore, it is to be understood that some steps may be eliminated. The start and end of the method 200 are indicated by "S" and "E," respectively.

Per block 202, the controller C is programmed to determine if the device D has been detected via the position encoding unit 22. If so, the method 200 proceeds to block 204. If not, the method 200 loops back to block 202. Per block 204, the controller C is programmed to obtain a speed of the device D via the position encoding unit 22. As the device D (e.g. second device 14 in FIG. 1) enters and traverses the first end 24 of the position encoding unit 22, its tires (e.g. tire 14A) interrupt the respective beams 66. The controller C may be configured to integrate the beam state data at high frequency to produce a continuous position and velocity signal that represents the actual motion of the device D.

Figure 5:
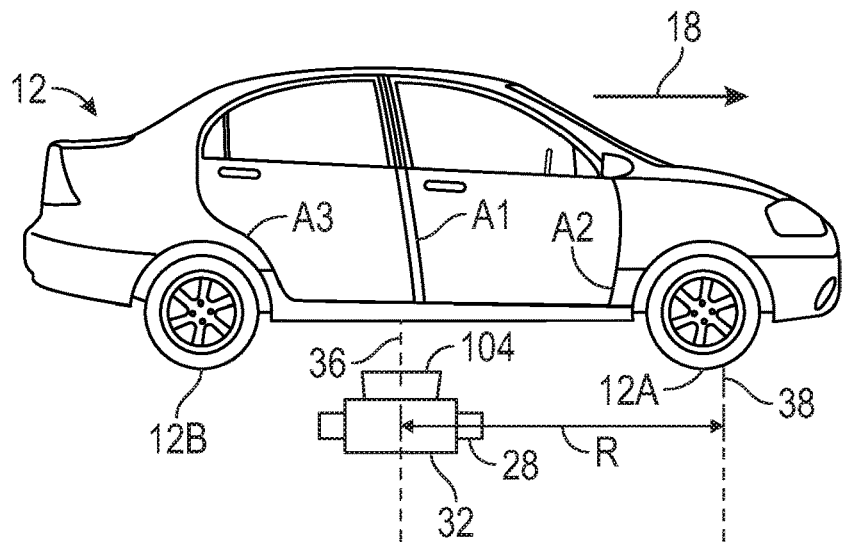
FIG. 5 is a schematic side view of the device and the ranged imaging unit of FIG. 1, at a first time.

Per block 206 of FIG. 4, the controller C may be programmed to correct for part orientation based on the vision unit 40. As noted above, the vision unit 40 has at least camera 42 and/or at least one laser-based position sensor 44 configured to measure an initial orientation and lateral position of the device D. Per block 208 of FIG. 4, the controller C is programmed to move the stage 28 (or stage 29) when the device D reaches a pre-programmed position. In one example, the pre-programmed position corresponds to at least one area of interest (e.g. first area of interest A1) on the device D crossing the predefined start zone 36. Referring to FIG. 5, a schematic side view of the first device 12 is shown at a first time, where the first area of interest A1 has crossed the predefined start zone 36. The stage speed of the stage 28 is synchronized to the speed of the device D to within a predefined match value. In a non-limiting example, the predefined match value is selected to be within a 1% velocity match.

Figure 6:
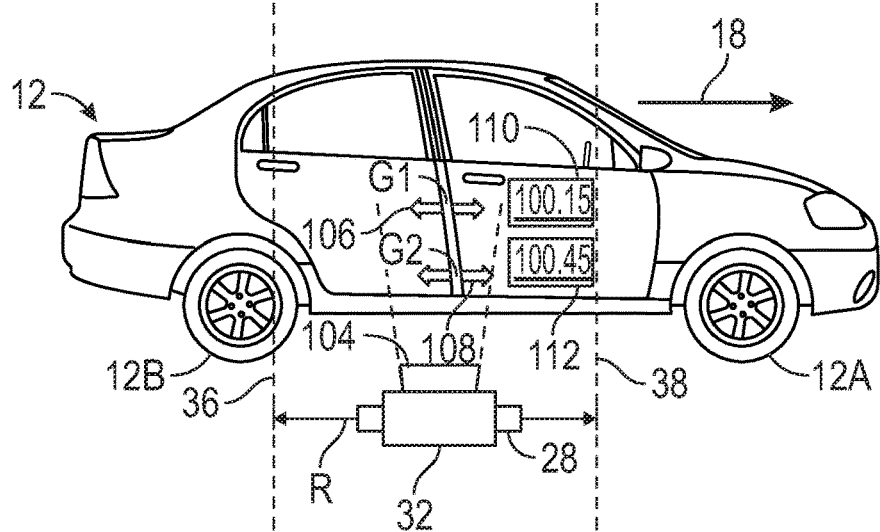
FIG. 6 is a schematic side view of the device and the ranged imaging unit of FIG. 5, at a second time.
Figure 7:
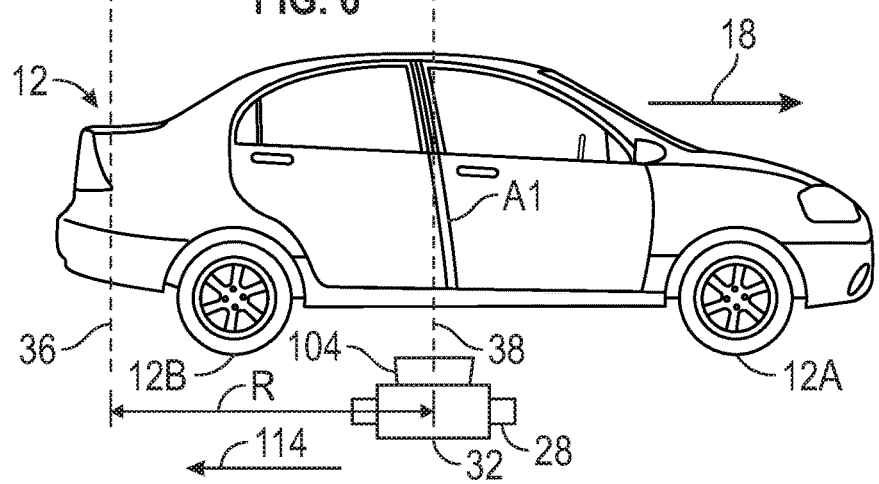
FIG. 7 is a schematic side view of the device and the ranged imaging unit of FIG. 6, at a third time.

FIG. 6 shows the first device 12 at a second time, where both the first device 12 and the stage 28 have moved in the first direction 18. Per block 210 of FIG. 4, the controller C is programmed to scan the area of interest A1 via the ranged imaging unit 32. Additionally, as shown in FIG. 6, the imaging data obtained by the ranged imaging unit 32 may be projected directly onto a portion of the device D. Referring to FIGS. 5, 6 and 7, the system 10 may include a projection unit 104 fixedly mounted to the stage 28 and adjacent to the ranged imaging unit 32 and configured to project the imaging data obtained by the ranged imaging unit 32 directly onto the moving device D.

For example, referring to FIG. 6, if the difference in surface profile between the pair of offset surfaces at the first gap G1 is 100.15%, the projection unit 104 may display that result via a first numerical data box 110. Similarly, referring to FIG. 6, the imaging data or result obtained at the second gap G2 may be displayed in a second numerical data box 112. Additionally, the location of the first gap G1 and the second gap G2 may be highlighted by the projection unit 104, respectively, with a first arrow 106 and a second arrow 108.

FIG. 7 shows the first device 12 at a third time, where both the first device 12 and the stage 28 have moved further in the first direction 18 such that the first area of interest A1 has crossed the predefined end zone 38. Per block 212 of FIG. 4, the controller C may be programmed to determine if the at least one area of interest has crossed the predefined end zone 38. If not, the method 200 loops back to block 212. If so, the method 200 proceeds to block 214 where the stage 28 (or stage 29 of FIG. 1) is reversed (as shown by direction 114 in FIG. 7) to the initial stage position shown in FIG. 5. From block 214, the method 200 may loop back to block 202 (as indicated by line 215) to determine if another device D has been detected and the tracking cycle may be repeated.

Referring to FIGS. 5, 6 and 7, the ranged imaging unit 32 defines a range of motion R that may be varied based on the application at hand. In one example, the range of motion R is selected to be less than the distance between the first area of interest A1 and the second area of interest A2 (see FIG. 1) such that the data from the first area of interest A1 and the second area of interest A2 may be collected in one tracking cycle. In another example, the range of motion R is selected to be greater than the distance between the first area of interest A1 and the second area of interest A2 such that the data from the first area of interest A1 and the second area of interest A2 is collected in two tracking cycles.

In summary, the stage 28 may be commanded by the controller C to move synchronously with the device D, at respective intervals triggered by the device D. Once the stage 28 is moving synchronously with the device D, the ranged imaging unit 32 may measure features as though both instrument and device D were fixed, in other words, with the ranged imaging unit 32 and the device D having the same frame of reference. When all features have been measured or the position limit of the stage 28 has been reached, the controller C may be configured to command the stage 28 to rapidly recycle (reverse in direction 114 back to the original stage position or to a different defined starting position for the next cycle) and the tracking cycle is repeated. Multiple tracking cycles may be run per device D, and multiple stages (for example, one at left, one at right, and one overhead) may operate based on tracking data from a single position encoding unit 22.

In another example, the internal scanning motion of the ranged imaging unit 32 may be synchronized with the position and speed of the device D to within a predefined match value. The controller C may be configured to employ the position data from the position encoding unit 22 to synchronize the internal scanning motion of the ranged imaging unit 32. For example, the stage 28 may be integrated with the ranged imaging unit 32. Alternatively, the synchronization may be accomplished via mathematical adjustment. In another example, raw ranged data obtained by the ranged imaging unit during a predefined interval may be corrected to compensate for the measured motion of the device D during the time that the measurement was taken. In other words, the controller C may be configured to correct the raw ranged data to match the speed of the device D during the predefined interval to obtain a modified ranged data, with the dimensional characteristics of the area of interest being obtained based in part on the modified ranged data. The controller C may employ an adaptive motion correction technique or other techniques available to those skilled in the art. The motion correction may be translation-based and performed on a Fourier transform of the raw ranged data.

The system 10 provides multiple technical advantages, including reducing the risk of position synchronization degradation or loss by employing a non-contact tracking solution that tracks the position of the moving part directly rather than the conveyor 20. The system 10 eliminates the risk of crashing robots in the event of a system failure by employing a long-range non-contact measurement that stays a threshold distance from the device D at all times.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for tracking at least one device in real-time, the system comprising:
   a position encoding unit configured to obtain a position data of the at least one device, the at least one device being configured to move in a first direction;
   a controller in communication with the position encoding unit and having a processor and tangible, non-transitory memory on which instructions are recorded;
   a stage configured to selectively move with a forward axis of travel and a reverse axis of travel substantially parallel to the first direction and having a stage speed controllable by the controller;
   a ranged imaging unit fixedly mounted to the stage and movable between a predefined start zone and a predefined end zone, the ranged imaging unit being configured to selectively scan the at least one device upon command by the controller;
   wherein execution of the instructions by the processor causes the controller to:
      determine a speed of the device, based in part on the position data from the position encoding unit;
      when the at least one device reaches a pre-programmed position, selectively move the stage at the stage speed synchronized to the speed of the at least one device to within a predefined match value; and
      determine dimensional characteristics of at least one area of interest on the at least one device, via the ranged imaging unit.

2. The system of claim 1, wherein:
   the at least one device is mounted to a conveyor; and
   the at least one device is at least one of a partially assembled vehicle and a fully assembled vehicle.

3. The system of claim 1, wherein:
   the pre-programmed position corresponds to the at least one area of interest on the device crossing the predefined start zone.

4. The system of claim 3, wherein the controller is configured to:
   determine if the at least one area of interest has exited the predefined end zone, based in part on the position data; and
   when the at least one area of interest has exited the predefined end zone, reverse the stage along the reverse axis of travel.

5. The system of claim 1, wherein:
   the position encoding unit includes an array of photosensor pairs each having a respective emitter and a respective receiver;
   wherein the respective emitter is configured to transmit a respective beam directed towards the at least one device at a beam angle relative to the first direction; and
   wherein the respective receiver is configured to sense a respective beam state of the respective beam and transmit the respective beam state to the controller.

6. The system of claim 5, wherein:
   the pre-programmed position corresponds to a respective location of the respective beam of the position encoding unit.

7. The system of claim 5, wherein:
   the array of photosensor pairs configured to have overlapping beams such that at least one pair of the array of photosensor pairs overlaps with another pair of the array of photosensor pairs.

8. The system of claim 1, further comprising:
   a vision unit having at least one camera and/or at least one laser-based position sensor, the vision unit being configured to measure an initial orientation and a lateral position of the at least one device when the device enters the pre-programmed position.

9. The system of claim 1, further comprising:
a projection unit fixedly mounted to the stage and configured to project data obtained by the ranged imaging unit directly onto the at least one device.

10. The system of claim 1, further comprising:
a stage servo drive in communication with the controller and configured to drive the stage;
wherein the controller is configured to generate a continuous signal encoding motion of the device, based in part on the position encoding unit, the continuous signal being transmitted as an auxiliary input to the stage servo drive; and
wherein the stage servo drive is configured to drive the stage based in part on the auxiliary input.

11. The system of claim 1, further comprising:
a stage servo drive in communication with the controller and configured to drive the stage;
wherein the controller is configured to command the stage servo drive to move at a constant value based on the speed of the at least one device when the at least one device reaches the pre-programmed position; and
wherein the controller is configured to monitor the speed of the at least one device and at least one of adjust and abort the command for the stage to move if a difference between the speed of the at least one device and the constant value exceeds a predefined limit.

12. The system of claim 1, wherein the controller is configured to:
synchronize an internal scanning motion of the ranged imaging unit with the at least one device based on the position data.

13. A system for tracking at least one device in real-time, the system comprising:
a position encoding unit configured to obtain a position data of the at least one device, the at least one device being configured to move in a first direction;
a controller in communication with the position encoding unit and having a processor and tangible, non-transitory memory on which instructions are recorded;
a ranged imaging unit configured to selectively scan the at least one device upon command by the controller;
wherein execution of the instructions by the processor causes the controller to:
command the ranged imaging unit to scan the at least one device during a predefined time interval and obtain a raw ranged data;
determine a speed of the device during the predefined time interval, based in part on the position data from the position encoding unit;
correct the raw ranged data to match the speed of the at least one device during the predefined time interval to obtain a modified ranged data; and
determine dimensional characteristics of at least one area of interest on the at least one device based in part on the modified ranged data.

14. A method for tracking at least one device moving in a first direction with a system having a position encoding unit and a controller including a processor and tangible, non-transitory memory, the method comprising:
configuring a stage to selectively move with a forward axis of travel and a reverse axis of travel substantially parallel to the first direction and with a stage speed controllable by the controller;
mounting a ranged imaging unit to the stage such that the ranged imaging unit is movable between a predefined start zone and a predefined end zone and configuring the ranged imaging unit to selectively scan the at least one device upon command by the controller;
obtaining a position data of the at least one device in real-time, via the position encoding unit;
determining a speed of the at least one device, via the controller, based in part on the position data from the position encoding unit;
when the at least one device reaches a pre-programmed position, selectively moving the stage at the stage speed synchronized to the speed of the at least one device to within a predefined match value, via the controller; and
determining dimensional characteristics of at least one area of interest on the at least one device, via the ranged imaging unit.

15. The method of claim 14, further comprising:
determining if the at least one area of interest has exited the predefined end zone, based in part on the position data, the pre-programmed position corresponding to the at least one area of interest on the device crossing the predefined start zone; and
when the at least one area of interest has exited the predefined end zone, reversing the stage along the reverse axis of travel to an initial stage position.

16. The method of claim 14, further comprising:
including an array of photosensor pairs in the position encoding unit, the array of photosensor pairs each having a respective emitter and a respective receiver;
transmitting a respective beam directed towards the at least one device at a beam angle relative to the first direction via the respective emitter; and
configuring the array of photosensor pairs with overlapping beams such that at least one pair of the array of photosensor pairs overlaps with another pair of the array of photosensor pairs.

17. The method of claim 16, wherein:
the pre-programmed position corresponds to a respective location of the respective beam of the position encoding unit.

18. The method of claim 14, further comprising:
measuring an initial orientation and a lateral position of the at least one device via a vision unit having at least one camera and/or at least one laser-based position sensor; and
projecting data obtained by the ranged imaging unit directly onto the at least one device via a projection unit fixedly mounted to the stage.

19. The method of claim 14, further comprising:
generating a continuous signal encoding motion of the device based on the position data, via the controller;
transmitting the continuous signal as an auxiliary input to a stage servo drive in communication with the controller; and
driving the stage via the stage servo drive, based in part on the auxiliary input.

20. The method of claim 14, further comprising:
driving the stage via a stage servo drive in communication with the controller; commanding the stage servo drive to move at a constant value based on the speed of the at least one device when the at least one device reaches a preprogrammed position, via the controller; and
monitoring the speed of the at least one device and at least one of adjust and abort the stage move command if a difference between the speed of the at least one device and the constant value exceeds a predefined limit, via the controller.

\* \* \* \* \*